March 5, 1963 E. C. JACOBSON 3,079,832
POWDER TAMPING AND RETRIEVING IMPLEMENT
Filed Aug. 15, 1960
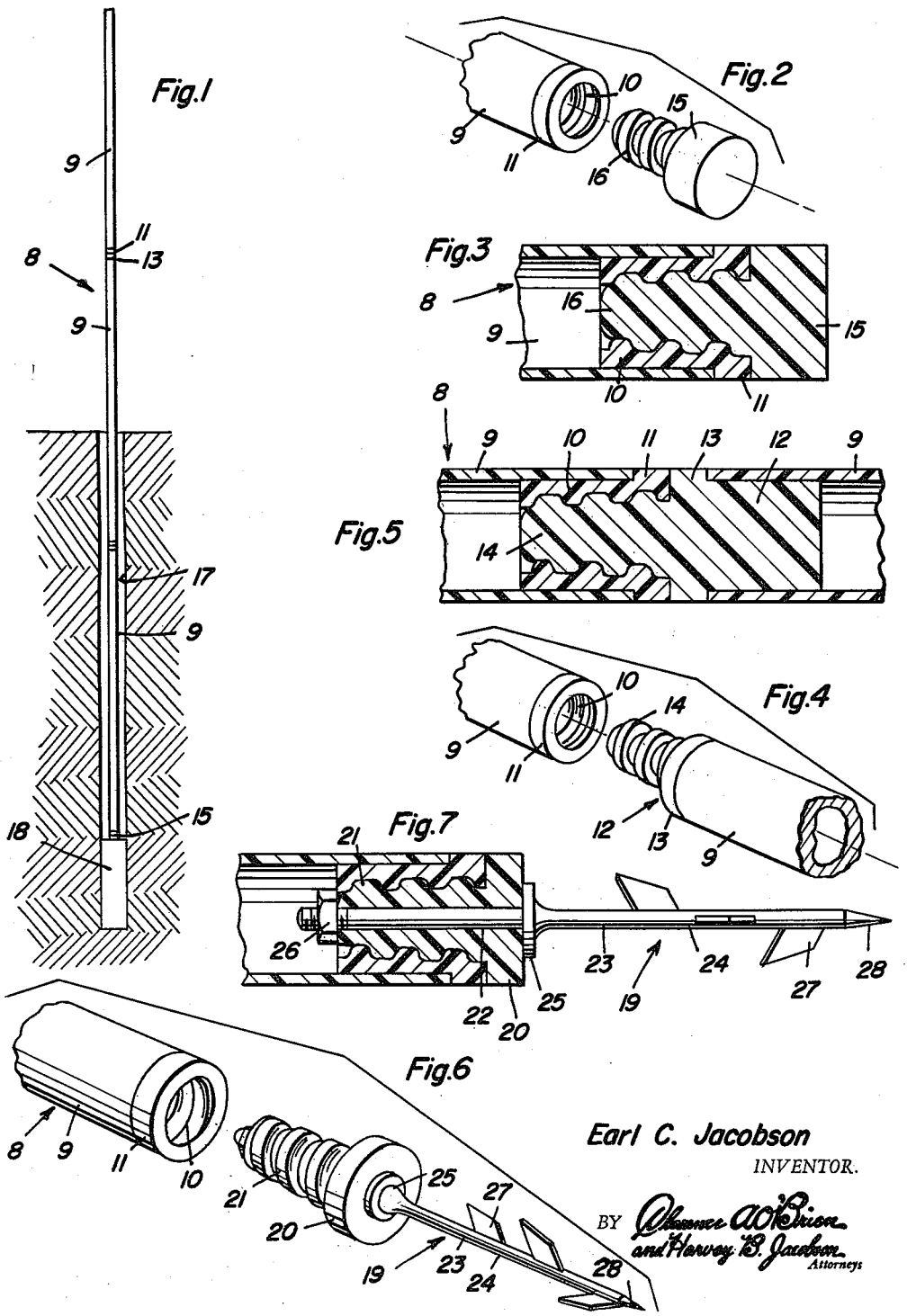
Earl C. Jacobson
INVENTOR.

United States Patent Office 3,079,832
Patented Mar. 5, 1963

3,079,832
POWDER TAMPING AND RETRIEVING
IMPLEMENT
Earl C. Jacobson, 656 N. 33rd, Springfield, Oreg.
Filed Aug. 15, 1960, Ser. No. 49,527
1 Claim. (Cl. 86—21)

This invention relates to new and useful improvements in powder implements particularly, although not necessarily, for vertical drill holes and has for its primary object to provide, in a manner as hereinafter set forth, a device of this character which, in addition to serving as a tamper, is also adapted to function as a retriever for expeditiously, and safely, removing defective or jammed powder sticks from the hole.

Another very important object of the present invention is to provide, in a combination implement of the aforementioned character comprising a tubular, plastic pole including any desired number of sections, novel means for detachably connecting the sections and for removably mounting the tamping and retrieving tools on one end of said pole.

Other objects of the invention are to provide a combination powder tamping and retrieving implement of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view, showing the implement in use as a tamper;

FIGURE 2 is a perspective view of the forward end portion of the device, showing the tamping head separated from the pole;

FIGURE 3 is a view in longitudinal section through the forward end portion of the device with the tamping head mounted in the pole;

FIGURE 4 is a perspective view of one of the pole joints, showing the sections separated;

FIGURE 5 is a view in longitudinal section through one of the section joints;

FIGURE 6 is a perspective view of the forward end portion of the pole and the retrieving tool, showing said pole and said retrieving tool separated; and FIGURE 7 is a longitudinal sectional view through the forward end portion of the pole with the retrieving tool mounted therein.

Referring now to the drawing in detail, it will be seen that the embodiment of the invention which has been illustrated comprises a pole which is designated generally by reference numeral 8. The pole 8 includes any desired number of tubular sections 9 of a suitable plastic. The sections 9 may also be of any desired length and diameter.

Fixed in the forward end portions of the pole sections 9 are slightly longitudinally tapered, internally threaded bushings or sleeves 10 which are also of a suitable plastic. The sleeves 10 comprise enlarged outer end portions or radially projecting heads 11 providing shoulders which abut the forward ends of the sections 9.

Fixed in the rear or inner end portions of the sections 9 are couplings 12 of a suitable plastic. The couplings 12 include enlarged intermediate portions 13 which abut the rear ends of the sections 9 and the enlarged ends 11 of the sleeves 10. The couplings 12 further include slightly longitudinally tapered shanks or stems 14 which are screwed into the sleeves 10 for detachably connecting the sections 9.

Removably mounted in the forwardmost sleeve 10 is a head 15 for tamping the charge. The head 15 comprises a slightly longitudinally tapered threaded shank or stem 16 which is screwed into the forwardmost sleeve 10 for removably mounting said head on the pole 8.

It is thought that the use of the device as thus far described will be readily apparent from a consideration of the foregoing. Briefly, the desired number of sections 9 are connected, according to the desired pole length, and the head 15 is mounted on the forward end of the pole. The implement is then inserted in the hole, as indicated at 17, and the charge 18 therein is tamped in the usual manner.

For removing defective or jammed powder sticks from the hole, the head 15 is removed and a retrieving tool 19 is substituted therefor on the forward end of the pole 8. The retrieving tool 19 includes an adapter or head 20 comprising an integral, slightly longitudinally tapered threaded plug, shank or stem 21 which is screwed into the sleeve 10 on the forward end of the pole 8. The head 20 projects radially beyond the plug 21 for abutting engagement with the head 11. Extending longitudinally through the head 20 is a bore 22. The bore 22 is for the reception of the rear end portion of the shaft 23 of a spear 24. At an intermediate point, the shaft 23 is provided with a collar or flange 25 which abuts the head 20. A retaining nut 26 is threaded on the rear end portion of the shaft 23 and coacts with the collar or flange 25 for securing said shaft in position. Projecting from the shaft 23 is a plurality of hooks or spurs 27.

In use, a pole of the desired length is assembled and the spear 19 is mounted thereon. The implement is then inserted in the hole and the spear 19 is pushed into the powder stick. The implement is then pulled back toward the mouth of the hole and when this occurs the spurs 27 are set in the powder for withdrawing the charge in an obvious manner. The complete device, with the exception of the retriever 19 is of smooth plastic for preventing sparking. The retriever 19 may be of any suitable metal. However, the shaft 23 of the spear comprises a penetrating point 28 of brass for preventing sparking.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
A powder tamping implement comprising a tubular pole, an internally threaded bushing fixedly mounted in one end of the pole, said bushing including a radially projecting head of a diameter equal to the diameter of the tubular pole on its outer end abutting said one end of the pole, a removable plug comprising a stem threadedly mounted in the bushing and including on its outer end a radially projecting head of a diameter equal to the diameter of the tubular pole abutting the first named head for frictionally locking the plug in the bushing, said two heads forming a smooth continuation of the outer surface of the tubular pole, said pole, bushing and plug being of plastic for preventing sparking, said bushing and plug being longitudinally tapered and including coarse threads for providing a quick-detachable connection, and a powder stick retrieving tool removably mounted on the plug and extending forwardly therefrom, said tool comprising an elongated equal diameter shaft terminating at the extreme forward end thereof in a relatively short piercing point, and spurs mounted on the shaft, each spur being both longitudinally and circumferentially spaced from the adjoining spurs about said shaft, said quick-detachable connection providing for the replacement of said retrieving tool by a tamping head.

References Cited in the file of this patent

UNITED STATES PATENTS

| | | |
|---|---|---|
| 1,306,316 | Smiley | June 10, 1919 |
| 1,509,028 | Phillips | Sept. 16, 1924 |
| 1,789,214 | Carson | Jan. 13, 1931 |
| 2,324,886 | Sowders | July 20, 1943 |
| 2,654,285 | McGirr | Oct. 6, 1953 |
| 2,787,933 | Wester | Apr. 9, 1957 |